March 26, 1929.  F. E. SMITH  1,706,501
TANDEM DRIVE FOR CONVEYERS
Filed April 15, 1926  2 Sheets-Sheet 1
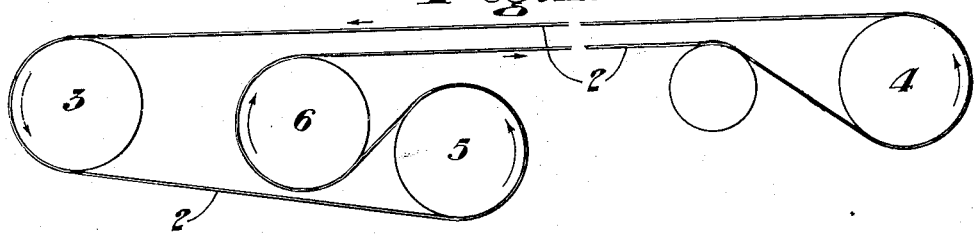
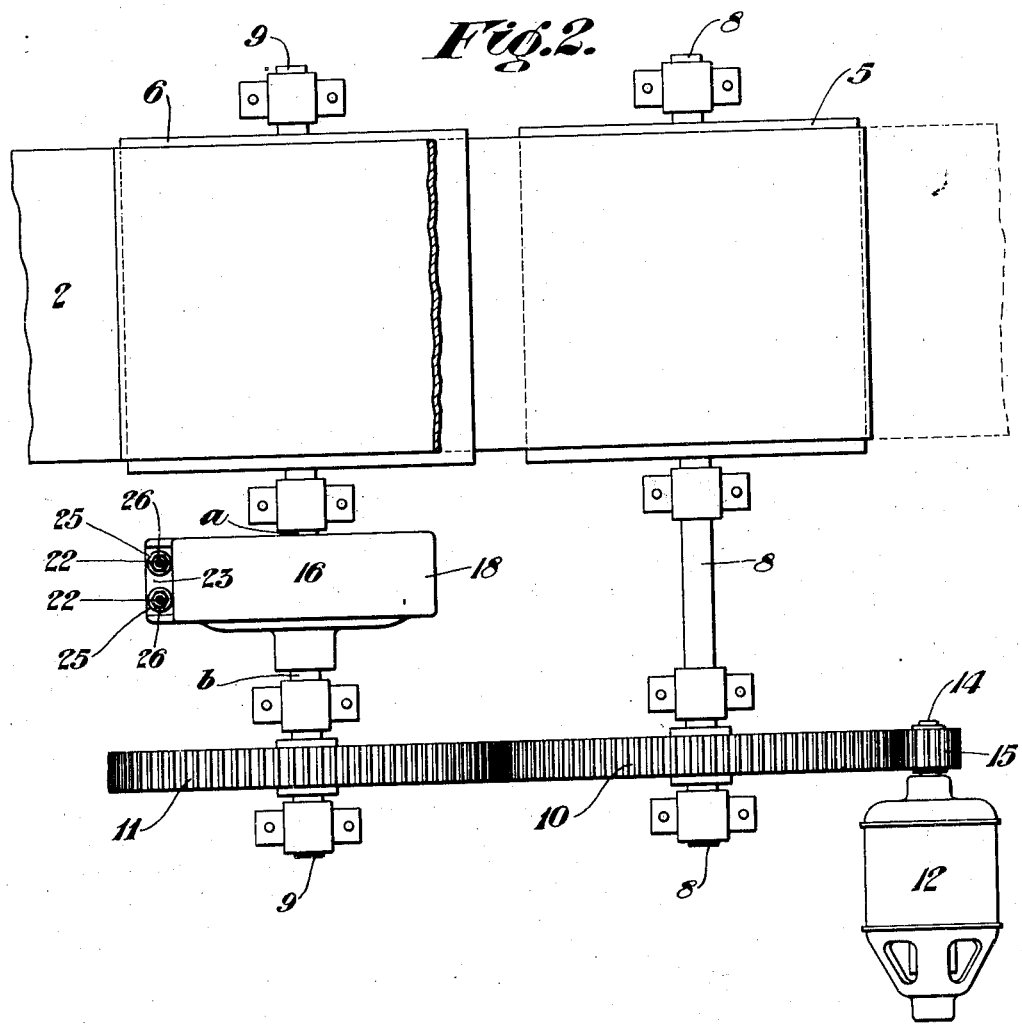
Witnesses:
Edwin Trueb
Inventor:
FRANK E. SMITH,
by D. Anthony Usina
his Attorney.

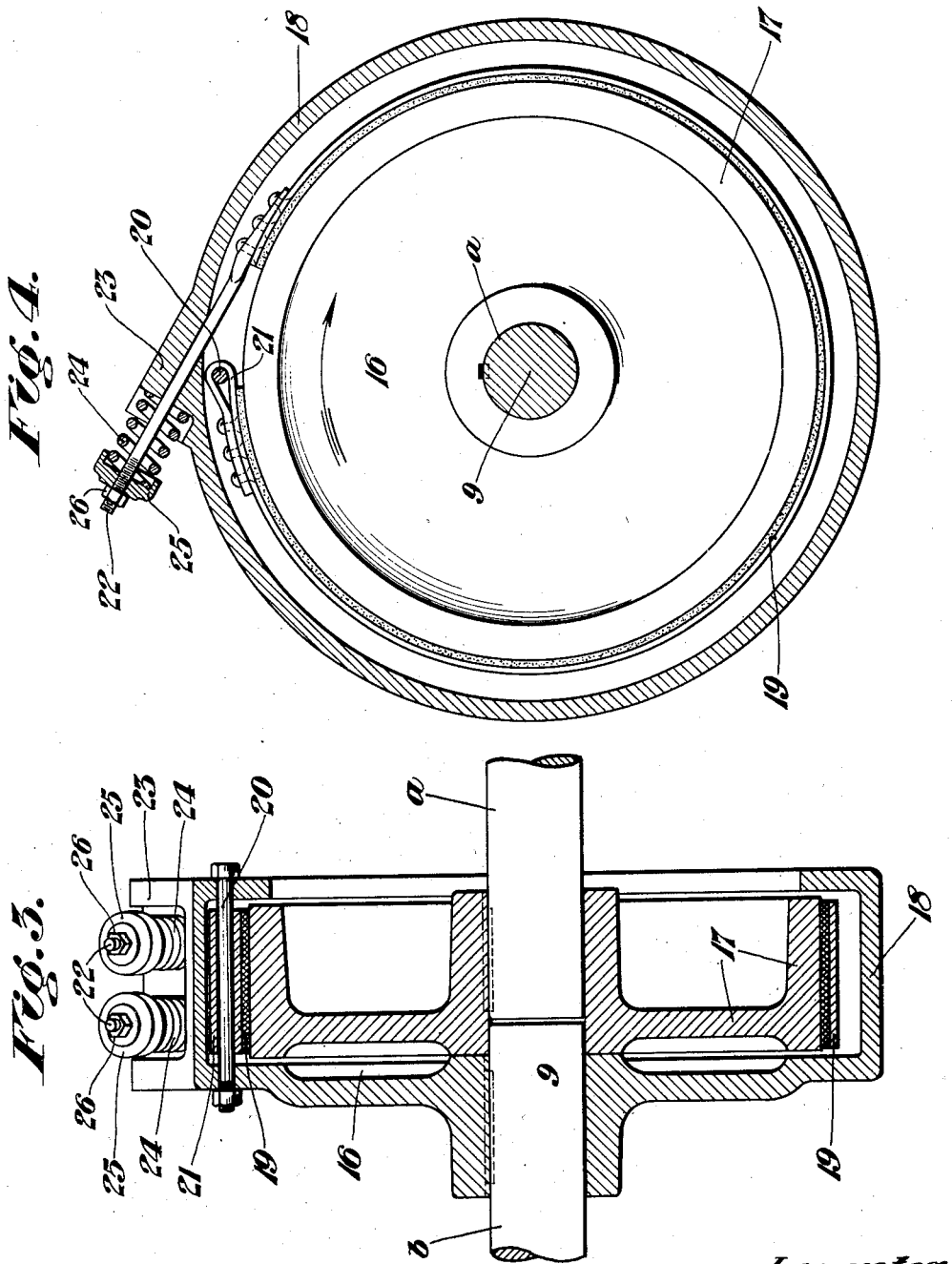

Patented Mar. 26, 1929.

1,706,501

UNITED STATES PATENT OFFICE.

FRANK E. SMITH, OF SCOTTDALE, PENNSYLVANIA.

TANDEM DRIVE FOR CONVEYERS.

Application filed April 15, 1926. Serial No. 102,229.

This invention relates to tandem drives for endless conveyers and has for its object the provision of a tandem drive for conveyers in which the running power is nearly equal to the starting power, and wherein it is necessary to use the two pulleys of the drive at all times.

In the present invention the main driving pulley has a lesser surface speed than the sub-driving pulley and the sub-driving pulley is driven through a constant torque coupling which is adapted to slip at a predetermined torque or load. The surface speed of the pulleys being constant and the coupling having a constant torque, the coupling will slip rather than overload, whereby the sub-driving pulley will carry a predetermined fraction of the load only, and belt stress will be properly proportioned without slip of the belt on the pulleys.

In the drawings:

Figure 1 is a somewhat diagrammatic view of a conveyer embodying my invention.

Figure 2 is an enlarged plan of the tandem drive embodying my invention.

Figure 3 is a detail sectional view through the clutch or constant torque coupling.

Figure 4 is a vertical sectional view through the coupling.

Referring more particularly to the drawings, the numeral 2 designates the endless conveyer belt which is trained over idler pulleys 3 and 4 at each end and over main and sub-drive pulleys 5 and 6 at a point intermediate its ends.

The main drive pulley 5 may be of slightly less diameter than the sub-drive pulley 6, or may have a lesser speed of rotation and be of the same diameter as the sub-drive pulley 6, so that it has a lesser surface speed than the sub-drive pulley 6. The main and sub-drive pulleys are mounted on drive shafts 8 and 9, respectively, which are geared together by gears 10 and 11. The gears 10 and 11 will be of the same size if the pulley 5 is of less diameter than the sub-drive pulley 6, however, if the pulleys 5 and 6 are of the same diameter the gear 11 will be of a slightly greater diameter than the gear 10, so as to provide for a differential surface speed of the pulleys. A motor 12 furnishes the driving power for the shafts 8 and 9 and has its armature shaft 14 connected to the gear 10 by a pinion 15. The differential surface speed of the pulleys 5 and 6 will cause a sufficient tension of the belt 2 on the drive pulley 5 to compel the pulley 5 to constantly drive its portion of the load without belt slip.

The sub-pulley drive shaft 9 is divided intermediate its ends into parts $a$ and $b$, and connected by a constant torque coupling or clutch 16, which is designed to slip at a definite torque or power. The diameter, the spring pressure and coefficient of friction of the coupling being constant, the coupling will slip rather than overload. For instance, if a 200 H. P. drive is required the coupling 16 is adjusted so as to slip at a 50 H. P. load, the sub-drive pulley 6 will then drive up to 50 H. P. while the main drive pulley 5 must drive the remaining load or 150 H. P.

The coupling 16 shown is in the form of a friction drive-type clutch, and consists of a drum 17 which is keyed on the part $a$ of the shaft 9, and a band holder or housing member 18 which is keyed on the part $b$ of the shaft 9 and encloses the drum 17. A friction band 19 is mounted around the drum 17 and has its one end secured to the housing 18 by a bolt 20 which passes through a loop 21 on the end of the band and through apertures in the housing. The other end of the band 19 is provided with tension rods 22 which project through an apertured boss 23 on the housing 18 and carry tensioning springs 24 which are compressed against the boss 23, so as to tension the rods 22 and band 19, by cupped washers 25 and nuts 26.

The tension of the band 19 may be readily adjusted by screwing or unscrewing the nuts 26 to compress or release the springs 24, thereby adjusting the coupling to slip at any desired load.

With a tandem drive constructed and arranged as above described, the tension of the conveyer belt on the main drive pulley is provided for by the differential surface speeds of the pulleys, so that slip of the belt on the main drive pulley is prevented, and the coupling 16 provides means for automatically limiting the load carried by the sub-drive pulley, whereby the sub-drive pulley will carry a predetermined fraction of the load only, and belt stress will be properly proportioned without slip of the belt on the pulleys.

While I have shown and described one specific embodment of my invention, it will be understood that I do not wish to be limited thereto, since various modifications may be made without departing from the scope of my invention as defined in the appended claims.

I claim:

1. The combination with an endless belt conveyer, of tandem drive pulleys over which said conveyer belt is trained, one of said pulleys being a main drive pulley and the other of said pulleys being a sub-drive pulley, a drive shaft for said main drive pulley, a second drive shaft for said sub-drive pulley, said first named drive shaft being positively connected to said main drive pulley, said second named drive shaft being connected to said sub-drive pulley and being divided intermediate its ends, a constant torque coupling connecting the parts of said divided shaft, means for driving said first named shaft at a speed to operate said main drive pulley at the desired surface speed, and means tending to drive said second named shaft at a speed to rotate said sub-drive pulley at a greater surface speed than said main drive pulley, and said constant torque coupling being adapted to slip at a predetermined load to prevent slip of said sub-drive pulley relative to the conveyer belt and to limit the load carried by said sub-drive pulley.

2. The combination with an endless belt conveyer, of tandem drive pulleys over which said conveyer belt is trained, one of said pulleys being a main drive pulley and the other of said pulleys being a sub-drive pulley, said main drive pulley tending to have a lesser surface speed than said sub-drive pulley, means for driving said main drive pulley, and means for driving said sub-drive pulley, said last named means including a constant torque coupling adapted to prevent slip of said sub-drive pulley relative to the conveyer belt, and to limit the load carried by said sub-drive pulley.

3. The combination with an endless belt conveyer, of tandem drive pulleys over which said conveyer belt is trained, one of said pulleys being a main drive pulley and the other of said pulleys being a sub-drive pulley, said main drive pulley tending to have a lesser surface speed than said sub-drive pulley, means for driving said main drive pulley, and means for driving said sub-drive pulley, said last named means including a drive shaft divided intermediate its ends and having a constant torque coupling connecting the divided parts, said coupling comprising a drum member keyed on one of said shaft parts, a band holder and housing keyed on the other of said shaft parts and extending over and enclosing said drum member, and a friction band carried by said holder and frictionally engaging said drum.

4. The combination with an endless belt conveyer, of tandem drive pulleys over which said conveyer belt is trained, one of said pulleys being a main drive pulley and the other of said pulleys being a sub-drive pulley, said main drive pulley having a lesser diameter than said sub-drive pulley, a drive shaft for said main drive pulley, a second drive shaft for said sub-drive pulley, said first named drive shaft being positively connected to said main drive pulley, said second named drive shaft being connected to said sub-drive pulley and being divided intermediate its ends, a constant torque coupling connecting the parts of said second named drive shaft, said coupling being adapted to limit the load carried by said sub-drive pulley and prevent slip of said pulley relative to the conveyer belt, and means for driving said drive shafts so as to tend to operate said sub-drive pulley at a greater surface speed than said main drive pulley.

In testimony whereof, I have hereunto signed my name.

FRANK E. SMITH.